US008434576B1

(12) United States Patent
Ferguson

(10) Patent No.: US 8,434,576 B1
(45) Date of Patent: May 7, 2013

(54) MOBILE RECONNAISSANCE APPARATUS WITH ARTICULATING TRACTION CONTROL

(76) Inventor: Andrew Ferguson, Lake Oswego, OR (US)

( * ) Notice: Subject to any disclaimer, the term of this patent is extended or adjusted under 35 U.S.C. 154(b) by 0 days.

(21) Appl. No.: 13/590,745

(22) Filed: Aug. 21, 2012

(51) Int. Cl.
*B62D 55/06* (2006.01)
(52) U.S. Cl.
USPC .......................................... 180/14.2; 180/9.32
(58) Field of Classification Search ................. 180/14.1, 180/14.2, 9.1, 9.32
See application file for complete search history.

(56) References Cited

U.S. PATENT DOCUMENTS

| | | | | |
|---|---|---|---|---|
| 3,215,219 | A | * | 11/1965 | Forsyth et al. ............... 180/14.3 |
| 3,473,619 | A | * | 10/1969 | Dion ............................ 180/9.44 |
| 4,709,773 | A | | 12/1987 | Clement |
| 4,727,949 | A | * | 3/1988 | Rea et al. ..................... 180/9.32 |
| 4,898,256 | A | | 2/1990 | Lehner |
| 4,993,912 | A | | 2/1991 | King et al. |
| 5,323,867 | A | | 6/1994 | Griffin et al. |
| 5,577,567 | A | | 11/1996 | Johnson et al. |
| 6,523,629 | B1 | | 2/2003 | Buttz et al. |
| 6,837,318 | B1 | * | 1/2005 | Craig et al. ................... 180/6.7 |
| 7,926,598 | B2 | | 4/2011 | Rudakevych |
| 8,079,432 | B2 | | 12/2011 | Ohm et al. |
| 8,122,982 | B2 | | 2/2012 | Morey et al. |
| 2001/0047895 | A1 | | 12/2001 | De Fazio et al. |
| 2002/0062999 | A1 | | 5/2002 | De-Noor |
| 2007/0209844 | A1 | | 9/2007 | Kamimura |
| 2010/0179691 | A1 | | 7/2010 | Gal et al. |

FOREIGN PATENT DOCUMENTS

| | | |
|---|---|---|
| JP | 60176871 | 9/1985 |
| JP | 61067678 | 4/1986 |
| JP | 61160366 | 7/1986 |
| WO | 2005105388 | 11/2005 |

OTHER PUBLICATIONS

Technology Review, "Robot Soldier", Jun. 2012, p. 15, published by MIT, www.technologyreview.com.
NASA, "Urbie, the Urban Robot", http://www.nasa.gov/vision/earth/technologies/urbie.html, Jun. 26, 2001, 1 page (website accessed Aug. 14, 2012).
University of Minnesota, "Autonomous Stairclimbing", http://mars.cs.umn.edu/projects/current/Stairclimbing/Stairclimbing.html, 3 pages (website accessed Aug. 14, 2012).

(Continued)

*Primary Examiner* — Kevin Hurley
(74) *Attorney, Agent, or Firm* — Stolowitz Ford Cowger LLP

(57) ABSTRACT

A mobile apparatus has a first articulating section comprising a leading traction control assembly including multiple points of contact inclined at a forward angle, and a second articulating section comprising an intermediate traction control assembly. A propulsion system is configured to coordinate movement of the leading traction control assembly and the intermediate traction control assembly. A connector operatively couples the first articulating section to the second articulating section, and the first articulating section is configured to articulate relative to the second articulating section in response to one or more of the multiple points of contact of the leading traction control assembly coming into contact with an obstacle. A bias assembly is configured to exert a continuous compression force against one or both of the first articulating section and the second articulating section to maximize the number of points of contact between the mobile apparatus and the obstacle.

21 Claims, 8 Drawing Sheets

OTHER PUBLICATIONS

IRobot, "iRobot 510 PackBot", http://www.irobot.com/gi/filelibrary/pdfs/robots/iRobot_510_PackBot_2011.pdf, 8 pages (website accessed Aug. 14, 2012).

Nima Enayati et al., "Design and Manufacturing of a Tele-operative Rescue Robot With a Novel Track Arrangement", Industrial Robot: An International Journal, vol. 38, Issue 5, 2011, Emerald Group Publishing Limited, pp. 476-485.

UCSD Flow Control & Coordinated Robotics Lab, "iHop: a dynamic multimodal hopping robot", http://robotics.ucsd.edu/iHop.html, 2 pages (website accessed Aug. 14, 2012).

Jens-Stefan Gutmann et al., "Stair Climbing for Humanoid Robots Using Stereo Vision", Proceedings of the IEEE/RSJ International Conference on Intelligent Robots and Systems, Sep. 28-Oct. 2, 2004, Sandai, Japan, pp. 1407-1413.

* cited by examiner

MOBILE RECONNAISSANCE APPARATUS WITH ARTICULATING TRACTION CONTROL

BACKGROUND

The uses of known automated mobile devices range from domestic applications such as vacuuming a carpet, to military and law enforcement applications such as surveillance and reconnaissance activities, to extraterrestrial space exploration. Known mobile devices may operate with remote control and wireless communications which provide instructions as to direction, speed, other operating commands, or any combination thereof.

While known mobile devices may include the ability to operate over various types of terrain, the ability to navigate over obstacles is limited by the known means of locomotion. Accordingly, the uses of these mobile devices for domestic and law enforcement applications, for example, are also limited by their inability to access areas which include difficult terrain and/or obstacles.

DETAILED DESCRIPTION

A mobile device with fixed wheels and/or a single track provides for a reliable mode of transportation over an even surface, but may provide relatively inflexible solutions when attempting to climb over an obstacle or traverse a sunken grade. For example, the front of the mobile device may bulldoze into the obstacle or fall into the sunken grade, and thus inhibit a forward progress of the mobile device. When the front end of the mobile device is raised onto an object or lowered into the sunken grade, most of the points of contact of the wheels and/or track may lose contact with the ground, which further impedes an ability of the mobile device to gain traction.

One such obstacle which mobile devices may have a difficult time to navigate includes stairs, which are often found in multi-level homes and office buildings. Domestic robots or remote surveillance vehicles may be confined to operating on a single level of a building due to an inability to traverse the stairway. Stairs which include an overhang, such as a "bull-nose" design, may result in a catch point for the mobile device as it attempts to traverse the stair face.

In addition to the difficulties inherent with climbing a stairway, descending a stairway may subject the mobile device to intermittent changes in elevation, or falls, as the mobile device transitions from one stair to a lower stair. This can result in the mobile device tumbling end over end until it reaches the bottom of the stairway. Some conventional mobile devices include mechanisms for "righting" themselves, or turning over after having fallen down.

Figure 1:
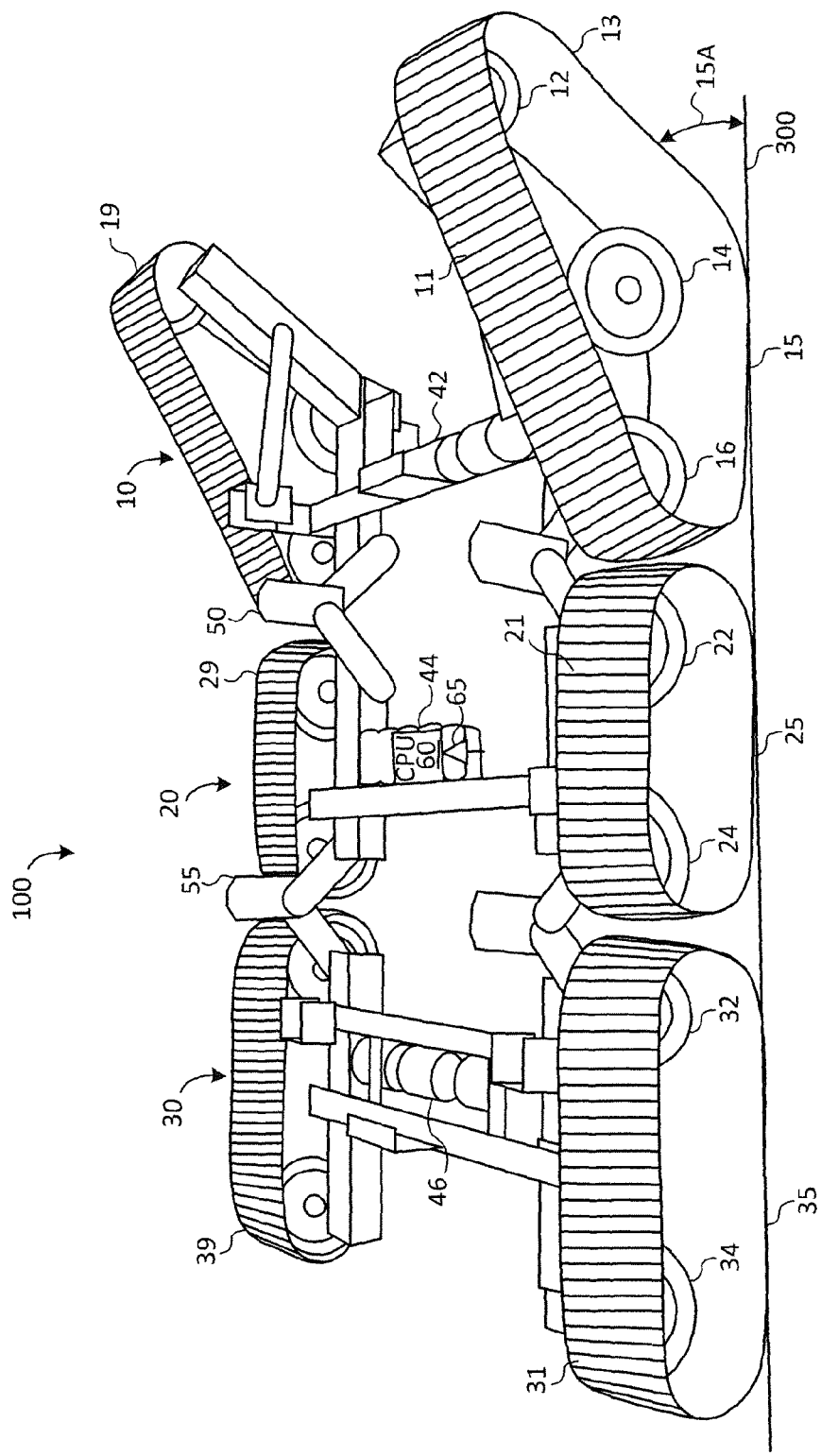
FIG. 1 illustrates an example of a mobile apparatus configured with three articulating sections.

FIG. 1 illustrates an example of a mobile apparatus 100 configured with three articulating sections, including a first articulating section 10, a second articulating section 20, and a third articulating section 30. The first articulating section 10 may comprise a leading traction control assembly 15 having a leading contact surface 13 inclined at a forward angle 15A with respect to ground 300. In some examples, the forward angle may be between 55 and 75 degrees; although, other angles may be used depending on the size and geometry of the stairs or other types of obstacles that are being traversed. The leading traction control assembly 15 may comprise one or more gears and/or wheels, such as an upper wheel 12, a first wheel 14, a second wheel 16, or any combination thereof. In some examples, the leading traction control assembly 15 may comprise one or more tracks, such as a first track 11 and/or an opposite-side first track 19.

The second articulating section 20 may comprise an intermediate traction control assembly 25. The intermediate traction control assembly 25 may comprise one or more gears and/or wheels, such as a first wheel 22, a second wheel 24, or any combination thereof. In some examples, the intermediate traction control assembly 25 may comprise one or more tracks, such as a second track 21 and/or an opposite-side second track 29.

Similarly, the third articulating section 30 may comprise a trailing traction control assembly 35. The trailing traction control assembly 35 may comprise one or more gears and/or wheels, such as a first wheel 32, a second wheel 34, or any combination thereof. In some examples, the trailing traction control assembly 35 may comprise one or more tracks, such as a third track 31 and/or an opposite-side third track 39. The tracks associated with the articulating sections may be configured with different types of traction surfaces, depending on what type of terrain they are being used for. For example, a rubber and/or textured compound with a high coefficient of friction may be used for relatively smooth terrains, such as marble or concrete, and a smoother track surface may be used for traversing carpet.

The mobile apparatus 100 may comprise a first connector 50 operatively coupling the first articulating section 10 to the second articulating section 20. The first articulating section 10 may be configured to articulate relative to the second articulating section 20 in response to one or more points of contact of the leading contact surface 13 coming into contact with an obstacle. The forward angle 15A associated with the one or more points of contact may vary according to the articulation of the first articulating section 10.

In some examples, the second articulating section 20 may articulate relative to the first articulating section 10. The first connector 50 may comprise a left connector operatively coupling a left side of the first articulating section 10 to a left side of the second articulating section 20, and a right connector operatively coupling a right side of the first articulating section 10 to a right side of the second articulating section 20.

Additionally, mobile apparatus 100 may comprise a second connector 55 operatively coupling the third articulating section 30 to the second articulating section 20. The third articulating section 30 may be configured to articulate relative to the second articulating section 20. In some examples, the second articulating section 20 may articulate relative to the third articulating 30. The second connector 55 may comprise a left connector operatively coupling a left side of the second articulating section 20 to a left side of the third articulating section 30, and a right connector operatively coupling a right side of the second articulating section 20 to a right side of the third articulating section 30.

A propulsion system may be configured to coordinate movement of the leading traction control assembly 15, the intermediate traction control assembly 25, the trailing traction control assembly 35, or any combination thereof. For example, the propulsion system may include a leading propulsion device 42, an intermediate propulsion device 44, a trailing propulsion device 46, or any combination thereof. The propulsion system may include means for providing a tractive effort of the mobile apparatus 100.

In some examples, one or more of the propulsion devices 42, 44, 46 may comprise one or more motors. For example, leading propulsion device 42 may comprise a right motor and a left motor corresponding to the first track 11 and the opposite-side first track 19, respectively. Intermediate propulsion device 44 may comprise a right motor and a left motor corresponding to the second track 11 and the opposite-side second track 29, respectively. Similarly, trailing propulsion device 46 may comprise a right motor and a left motor corresponding to the third track 31 and the opposite-side third track 39, respectively. Each section 10, 20, 30 may be independently controlled by one or two motors. In some examples, there may be a total of six motors which allow for variable power and enhanced maneuverability of the mobile apparatus 100.

Figure 2:
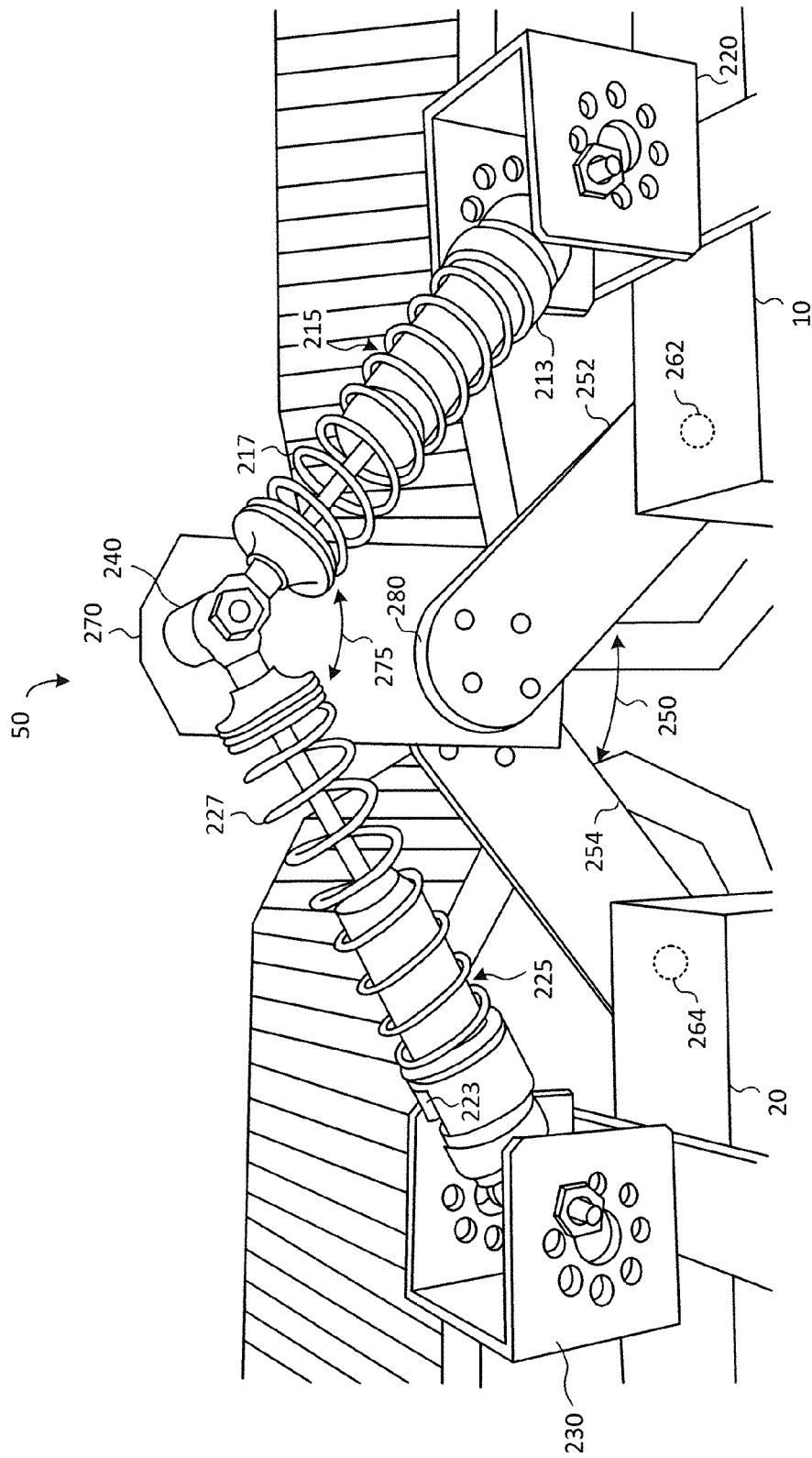
FIG. 2 illustrates an example connector located between two articulating sections of the mobile apparatus of FIG. 1.

FIG. 2 illustrates an example of the first connector 50 located between two articulating sections of the mobile apparatus 100 of FIG. 1. For example, the first connector 50 may operatively couple the first articulating section 10 to the second articulating section 20. The first connector 50 may comprise a first connecting member 252, which connects to the first articulating section 10 at a first pivot point 262, and a second connecting member 254, which connects to the second articulating section 20 at a second pivot point 264. The first articulating section 10 may be configured to articulate about the first pivot point 262. Additionally, the second articulating section 20 may be configured to articulate about the second pivot point 264.

The first connecting member 252 may be connected to the second connecting member 254 at a central connection 280. Central connection 280 may be located on a connection plate 270. In some examples, the first connecting member 252 may be rigidly connected to the second connecting member 254 via the central connection 280, to form an angle of connection 250. The angle of connection 250 may be approximately perpendicular and be configured to maintain a spaced-apart relationship between the first articulating section 10 and the second articulating section 20. Additionally, the angle of connection 250 provides for an elevated clearance area below the connection 280 and between the sections 10, 20 to avoid the first connector 50 from coming into contact with an obstacle, such as a stair.

The first connector 50 may be configured to allow the first articulating section 10 to articulate relative to the second articulating section 20, for example, in response to one or more of the multiple points of contact of the leading contact surface 13 (FIG. 1) coming into contact with an obstacle. The first connector 50 may provide for a flexibility in movement of the mobile apparatus 100, and may provide for a variability in articulation angle between the first articulating section 10 and the second articulating section 20.

The articulation of one or both of the first articulating section 10 and the second articulating section 20 may be controlled or moderated by one or more shock absorbers, such as a first shock absorber 215 and a second shock absorber 225. The first shock absorber 215 and/or the second shock absorber 225 may be configured to control the angle of articulation between the sections 10, 20, to apply pressure to a traction control assembly to ensure proper rotation, friction, and/or pressure points, and to absorb shock and provide for a smooth transition between obstacles, such as when the mobile apparatus 100 (FIG. 1) navigates a series of stairs. This may help stabilize the mobile apparatus 100 as it descends the stairs, such that the speed of descent may be controlled and/or moderated during the transition from one stair to a lower stair. Additionally, one or both of the first and second shock absorbers 215, 225 may be configured to both dampen shock and to maintain a tractive effort of the leading traction control assembly 15 (FIG. 1) in a sunken grade by exerting a spring force in the downward direction.

The first shock absorber 215 may comprise a first damping device 213 and a first bias element 217. The first damping device 213 may comprise a pneumatic or hydraulic cylinder, for example, configured to absorb or moderate shock. The first shock absorber 215 may be connected at a first end by a first connection point 220 of the first articulating section 10, and at a second end by a joint connection 240. The joint connection 240 may be located on the connection plate 270.

The first bias element 217 may comprise a spring or some other component configured to exert a compression force or a spring force. In some examples, the first damping device 213 may be configured to absorb or moderate shock during a dynamic movement of one or both of the first articulating section 10 and the second articulating section 20. The first bias element 217 may be configured to exert the spring force during either the dynamic movement of a section, or in a static and/or passive condition.

The first bias element 217 may be configured to exert a continuous spring force. In some examples, the continuous spring force may vary as a function of the compressed state of the first bias element 217, with a higher spring force associated with a fully compressed state (e.g., with one or both sections 10, 20 articulated upward, in a first direction of articulation), and a lower spring force associated with a more relaxed state (e.g., with one or both sections 10, 20 articulated downward, in a second direction of articulation, opposite the first direction). The compression force may continuously vary in the dynamic condition, for example, based on the amount of compression of the first bias element 217 due to the articulation of the first articulating section 10.

The second shock absorber 225 may be coupled between the second articulating section 20 and the first connector 50. The second shock absorber 225 may be configured similarly as the first second shock absorber 215. For example, the second shock absorber 225 may comprise a second damping device 223 and a second bias element 227. The second bias element 227 may comprise a spring configured to exert a continuous spring force during either the dynamic movement of a section, or in a static and/or passive operating condition. The second shock absorber 225 may be connected at a first end by a second connection point 230 of the second articulating section 20, and at a second end by the joint connection 240.

One or both of the bias elements 217, 227 may be configured to exert a compression force against the first articulating section 10 and/or the second articulating section 20. For example, the first bias element 217 may be coupled between the first articulating section 10 and the first connector 50 to exert a first compression force which is opposite in direction to the articulation of the first articulating section 10. In a dynamic mode of operation, both the first bias element 217 and the first shock absorber 213 may be configured to provide an opposing force to the articulation of the first articulating section 10.

The second articulating section 20 may be configured to articulate relative to the first articulating section 10. The second bias element 227 may be configured to exert a second compression force which is opposite in direction to the articulation of the second articulating section 20. In some examples, the first bias element 217 and/or the second bias element 227 may be configured to exert a compression force or spring force in the same direction as the articulation of the first articulating section 10 and/or the second articulating section 20. The compression force may operate to increase or decrease an angle of articulation of the first and/or second articulating sections 10, 20, depending on the direction of articulation, while the mobile device is traversing an obstacle. Additionally, by controlling the angle of articulation, the compression force may operate to maximize the friction force and/or points of contact between a traction device and the obstacle being traversed.

The articulation of the first articulating section 10 may increase a spring force associated with the first bias element 217 as the first shock absorber 215 is compressed. The spring force may be transferred from the first shock absorber 215 to the second shock absorber 225. The transferred spring force may cause the second shock absorber 225 to compress which may in turn cause a second spring force associated with the second bias element 227 to increase. The second spring force may be exerted on the second articulating section 20.

The first bias element 217 may be coupled to the first articulating section 10 at a first point, such as first connection point 220, the second bias element 227 may be coupled to the second articulating section 20 at a second point, such as second connection point 230, and both the first bias element 217 and second bias element 227 may be attached to the connector at a central point, such as joint connection 240. The first, central, and second points may be configured to form a bias angle 275. In some example, the bias angle 275 may be formed as an obtuse angle.

The bias angle 275 may vary during an articulation of the first articulating section 10 and/or the second articulating section 20. The bias angle 275 may vary from a minimum bias angle to a maximum bias angle. In some examples, a front portion of the second articulating section 20 may be configured to raise in response to the bias angle 275 reaching the maximum bias angle. At the maximum bias angle, the first hydraulic shock absorber 215 and/or the second hydraulic shock absorber 225 may be fully compressed.

In some examples, the second connector 55 (FIG. 1) may be configured similarly as the first connector 50 illustrated with reference to FIG. 2. For example, a bias assembly associated with the second connector may be configured to exert a compressive force which is opposite in direction to the articulation of the third articulating section 30 relative to the second articulating section 20. The bias assembly may comprise a third bias element coupled between the third articulating section 30 and the second connector 55, and a fourth bias element may be coupled between the second articulating section 20 and the second connector 55.

The third bias element may be configured to exert a compression force which is opposite in direction to the articulation of the third articulating section 30 relative to the second articulating section 20. The fourth bias element may be configured to exert a compression force which is opposite in direction to the articulation of the second articulating section 20 relative to the third articulating section 30. In some examples, the third bias element and/or the fourth bias element may be configured to exert a compression force or spring force in the same direction as the articulation of the third articulating section 30 and/or the second articulating section 20. The third bias element and the fourth bias element associated with second connector 55 may be arranged together to form a second bias angle, similar to the bias angle 275 of FIG. 2.

Figure 3A:
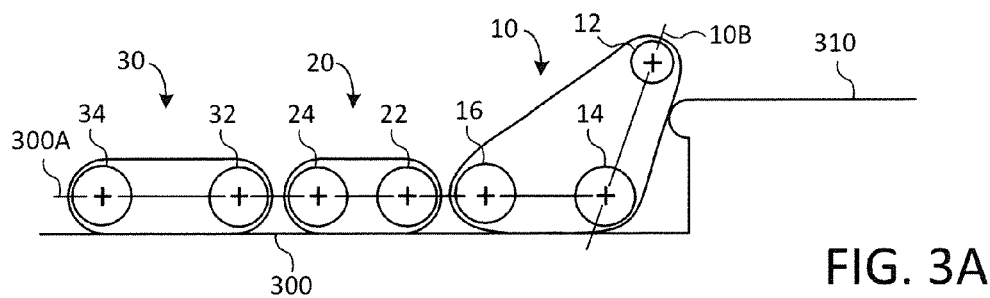
FIGS. 3A-3H pictorially illustrate the mobile apparatus of FIG. 1 traversing a flight of stairs.

FIGS. 3A-3H pictorially illustrate the mobile apparatus 100 of FIG. 1 traversing a flight of stairs, including a first stair 310. With reference to FIG. 3A, the mobile apparatus 100 begins with all three sections 10, 20, 30 located on the ground 300. Additionally, sections 10, 20, 30 may all be positioned at an approximately parallel angle 300A to the ground 300. The parallel angle 300A may intersect one or more of wheels 14, 16, 22, 24, 32, and 34.

In some examples, a lower portion of the first articulating section 10, comprising the first wheel 14 and the second wheel 16, and a lower portion of the second articulating section 20, comprising the first wheel 22 and the second wheel 24, may be arranged in a substantially parallel position when the mobile apparatus 100 travels over a relatively flat surface, such as the ground 300.

The first articulating section 10 may comprise an inclined approach angle 10B and be associated with a height 301. The inclined approach angle 10B may comprise an angle that is formed through the centerpoints of the upper wheel 12 and the first wheel 14 of the first traction control 10. In another example, the inclined approach angle 10B may correspond to an angle of a track located on the leading contact surface of the first articulating section, such as the forward angle 15A of the leading traction control assembly 15 (FIG. 1).

The height 301 of the first articulating section 10 may be equal to or greater than a stair height 302 associated with the first stair 310. By having at least a portion of the first articulating section 10 located above the stair height 302, the corner of the stair, shown as having a "bull-nose" design, can be easily navigated. The combination of the inclined approach angle 10B and the height 301 provide for multiple points of contact of the surface of the first articulating section 10, located between the upper wheel 12 and the first wheel 14, for traversing the first stair 310.

Figure 3B:
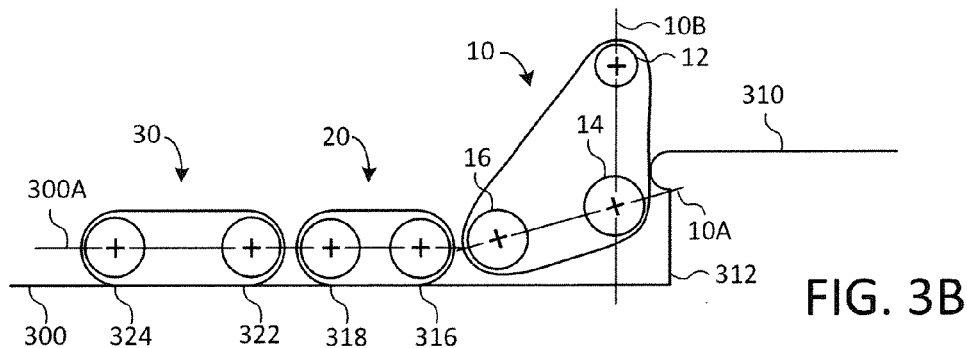

FIG. 3B illustrates the mobile apparatus 100 of FIG. 1 with the second traction control 20 remaining substantially parallel to the ground 300 when the front end of the first articulating section 10, including the upper wheel 12 and the first wheel 14, raises off the ground 300. As the first articulating section 10 climbs up a face 312 of the stair 310, the inclined approach angle 10B may increase until it reaches vertical. In some examples, a maximum upward articulation angle of the first articulating section 10 may be associated with the inclined approach angle 10B located in the vertical position.

The inclined approach angle 10B may be allowed to increase due, at least in part, to the articulation of the first articulating section 10 relative to the second articulating section 20. The second and third articulating sections 20, 30 may remain substantially parallel to each other, at the parallel angle 300A, as the front end of the first articulating section 10 raises off the ground 300. A leading section approach angle 10A, passing through the center points of the first wheel 14 and the second wheel 16 of the first articulating section 10, may be considered positive in this position.

The articulating sections 10, 20, 30 of the mobile apparatus 100 may be positioned such that at any given moment, multiple points of contact are being made while moving, climbing, or descending stairs and/or other obstacles. For example, as the first articulating section 10 climbs the stair 310, the mobile apparatus 100 may be configured to maintain a tractive effort on the ground at contact points 316, 318, 322, and 324 associated with the second and third articulating sections 20, 30, respectively.

Figure 3C:
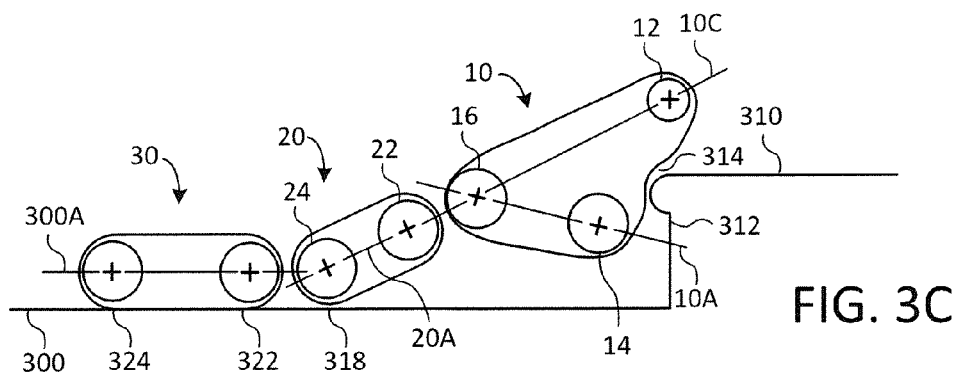

FIG. 3C illustrates a further articulation of the first articulating section 10 in a downward direction, as a front end of the second articulating section 20, including first wheel 22, lifts off the ground 300. Whereas the inclined approach angle 10A may be considered positive with reference to FIG. 3B as the mobile apparatus 100 initially climbs the face 312 of the stair 310, the inclined approach angle 10A may be considered negative as one or more contact points of the leading contact surface of the first articulating section 10 transition from the face 312 to a top surface 314 of the first stair 310.

A maximum downward articulation angle 10C may be associated with the negative angle of incline of the inclined approach angle 10A. In some examples, the maximum downward articulation angle 10C may pass through the center points of the upper wheel 12 and the second wheel 16 of the first articulating section 10, and be approximately parallel with an intermediate section approach angle 20A passing through the center points of the first wheel 22 and the second wheel 24 of the second articulating section 20. In some examples, the maximum downward articulation angle 10C may be greater than the intermediate section approach angle 20A. The negative angle of incline of the inclined approach angle 10A may allow the leading contact surface of the first articulating section 10 to increase the amount of tractive effort on the top surface 314 of the first stair 310.

Figure 3D:
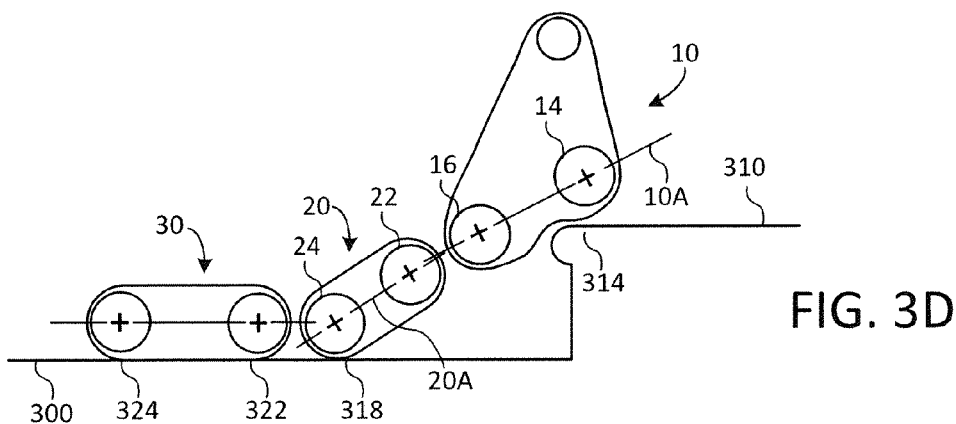

FIG. 3D illustrates a further articulation of the first articulating section 10 in an upward direction, as the first wheel 14 of the first articulating section 10 traverses the top surface 314 of the first stair 310. In this position, the leading edge approach angle 10A may be nearly parallel with the intermediate section approach angle 20A. Although the first wheel 22 of the second articulating section 20 may be raised off the ground 300, the second articulating section 20 may remain in contact with the ground 300 at contact point 318 due to the articulation between the second and third articulating sections 20, 30. Additionally, the third articulating section 30 may maintain tractive effort with the ground 300 through multiple points of contact 322, 324.

The points of contact 312, 314, 316, 318, 320, 322, 324, 326, 328, 332 may be referenced together with one or more of the wheels 12, 14, 16, 22, 24, 32, 34; however, it should be understood that other points of contact may be made with other parts of the articulating section 10, 20, 30, including portions of track intermediate the wheels, e.g., secondary contact points. In some examples, the primary points of contact associated with the wheels may provide for greater tractive effort than the second points of contact as the weight of the mobile apparatus 100 may provide more friction force at the contact points which are directly adjacent and/or below the wheels. Accordingly, the number of wheels that are in direct (or indirect) contact with the obstacle may greatly influence the total available tractive effort at the various stages of movement. Having a mobile apparatus with multiple articulating sections helps maximize the number of the primary contact points which remain in contact with the ground and/or the obstacle being traversed.

Figure 3E:
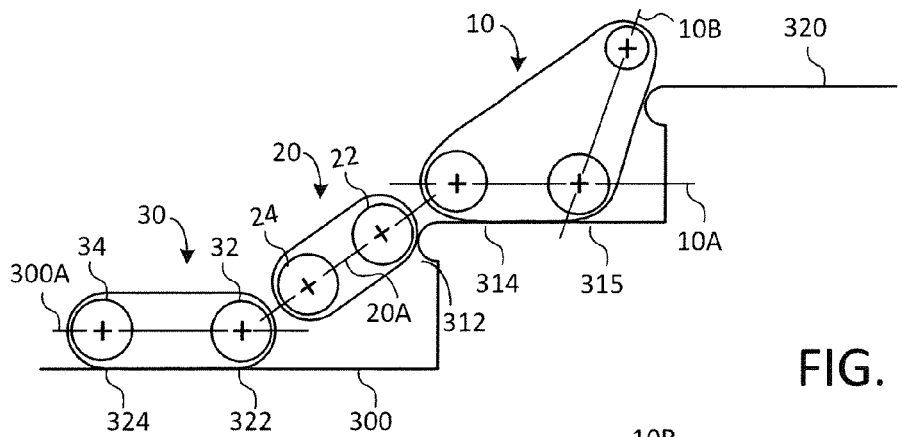

FIG. 3E illustrates the mobile apparatus 100 of FIG. 1 in which the first articulating section 10 may be positioned on the first stair 310, and the third articulating section 30 may remain completely on the ground 300. The leading section approach angle 10A associated with the first articulating section 10 may be substantially parallel with the top surface 314 of the first stair 310. Additionally, the first articulating section 10 may provide tractive effort at multiple points of the top surface 314 including contact point 315. The inclined approach angle 10B of the first articulating section 10 may traverse a second stair 320 in a similar manner as described with reference to FIG. 3B.

The second articulating section 20 is shown suspended between the ground 300 and the first stair 310. With the first articulating section 10 located on the first stair 310, the second articulating section 20 may make contact with the face 312 of the first stair 310 at a contact point associated with the first wheel 22. The contact at the face 312 may provide additional tractive effort to lift the second articulating section 20 up and over the face 312 of the first stair 310.

With reference to FIG. 2, the angle of connection 250 associated with the first connector 50 may be positioned intermediate the face 312 and the top surface 314 in order to provide clearance of the first connector 50 with the corner of the first stair 310. The third articulating section 30 may remain in contact with the ground 300 at multiple contact points 322, 324. In this position, the first wheel 32 and the second wheel 34 of the third articulating section 30 may be at the parallel angle 300A with respect to the ground.

Although the second articulating section 20 may be suspended between the ground 300 and the first stair 310, since both the first articulating section 10 and the third articulating section 30 may maintain multiple points of contact with the ground 300 and top surface 314 of the first stair 310, the mobile apparatus 100 is provided with sufficient tractive effort to continue traversing the obstacle without stalling.

Figure 3F:
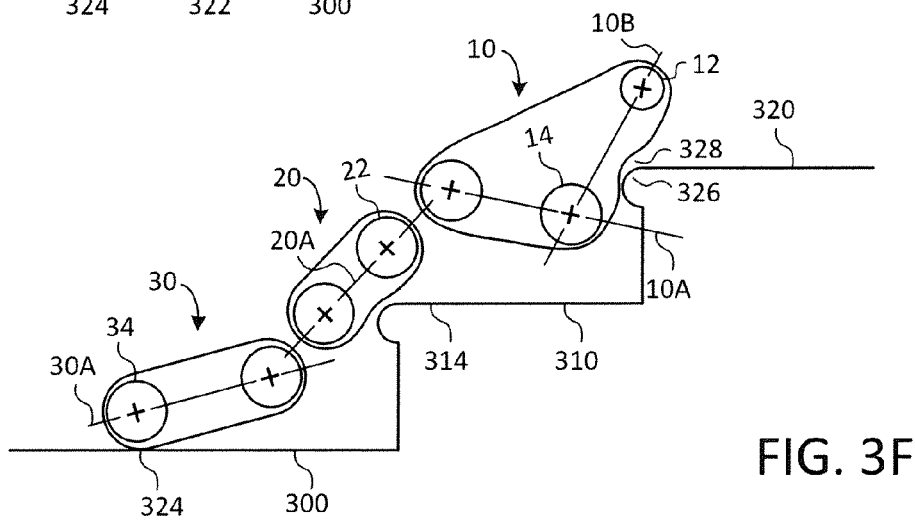

FIG. 3F illustrates the mobile apparatus 100 climbing both the first stair 310 and the second stair 320. In some examples, the inclined approach angle 10A may represent the maximum downward articulation angle when the mobile apparatus 100 is in this position. The negative angle of incline of the inclined approach angle 10B may allow the leading contact surface of the first articulating section 10 to increase the amount of tractive effort on the top surface 328 of the second stair 328, as the first articulating section 10 transitions up and over the face 326 of the second stair 320.

One or more of the bias elements (e.g., the first and/or second bias elements 217, 227) may be configured to exert a spring force which further promotes the articulation of the first articulating section in the downward direction, and results in the inclined approach angle 10B being negative. Additionally, the multi-section articulation of the mobile apparatus 100 may be configured to allow the second articulating section 20, including the first wheel 22, to increase the amount of tractive effort on the top surface 314 of the first stair 210, as the second articulating section 20 transitions onto the first stair 310.

A front end of the third articulating section 30 is shown lifted off the ground 300; however, the second wheel 34 may remain in contact with the ground at contact point 324. In this position, a third section approach angle 30A associated with the third articulating section may no longer be parallel with the ground 300. In this position, the leading section approach angle 10A may be considered as being a negative inclined angle (or associated with a negative amount of articulation), and the trailing section approach angle 30A may be considered as being a positive inclined angle (or associated with a positive amount of articulation). By articulating in multiple directions, each of the section 10, 20, 30 may simultaneously provide tractive effort on a top surface 328, 314, 324 of the second stair 320, the first stair 310, and the ground 300, respectively.

Figure 3G:
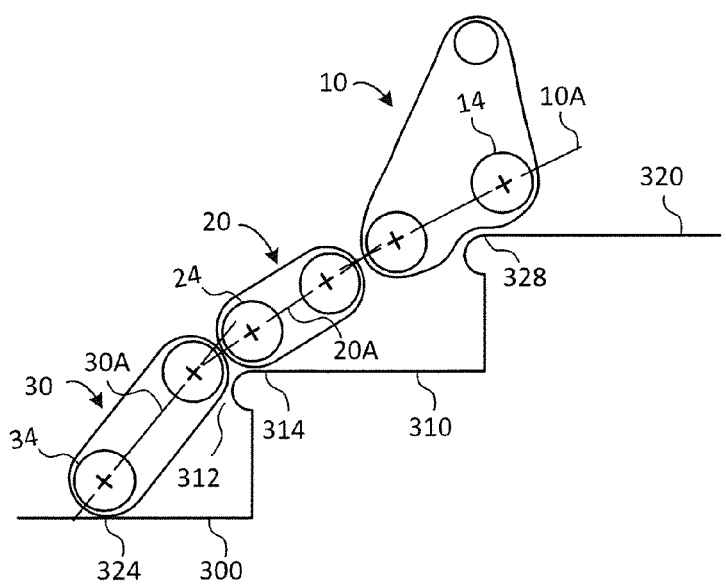

FIG. 3G illustrates a further articulation of the first articulating section 10 in an upward direction, as the first wheel 14 of the first articulating section 10 traverses the top surface 328 of the second stair 320. In this position, each of the sections 10, 20, 30 may simultaneously provide tractive effort on the three surfaces 328, 314, 324 of the second stair 320, the first stair 310, and the ground 300, respectively. Similarly, the three sections 10, 20, 30 may simultaneously contact the top surface of any three consecutive stairs in a flight of stairs.

In this position, the leading section approach angle 10A may be considered as being at a slightly negative inclined angle (or associated with a negative amount of articulation), and the trailing section approach angle 30A may also be considered as being a negative inclined angle (or associated with a negative amount of articulation). The mobile apparatus 100 may be configured to maintain tractive effort on the three surfaces 328, 314, 324 even though any one, or all, of the sections 10, 20, 30 may not be parallel with the surfaces 328, 314, 324, respectively.

Figure 3H:
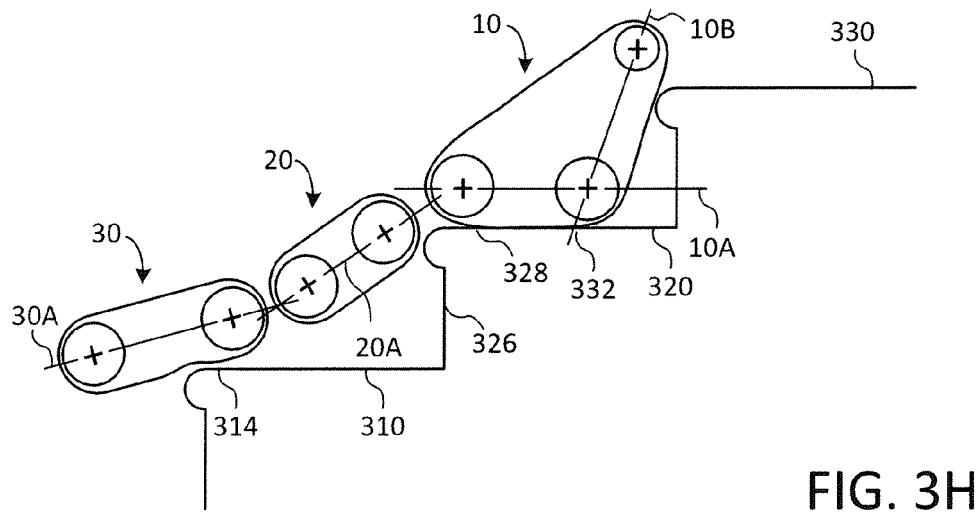

FIG. 3H illustrates the mobile apparatus 100 of FIG. 1 in which the first articulating section 10 may be positioned on the second stair 320, and the third articulating section 30 may be partially located on the first stair 310. Operation of the mobile apparatus 100 in this position may be similar to that described with reference to FIG. 3E.

The leading section approach angle 10A associated with the first articulating section 10 may be substantially parallel with the top surface 328 of the second stair 310. Additionally, the first articulating section 10 may provide tractive effort at multiple points of the top surface 328 including contact point 332. The inclined approach angle 10B of the first articulating section 10 may traverse a third stair 330 in a similar manner as described with reference to FIG. 3B.

The second articulating section 20 may be suspended between the first stair 310 and the second stair 320. With the first articulating section 10 located on the second stair 310, the second articulating section 20 may contact with the face 326 of the second stair 320. The contact at face 326 may provide tractive effort to lift the second articulating section 20 up and over the face 326 of the second stair 320. The third articulating section 30 may remain in partial contact with the ground 300 at contact point 324 to provide additional tractive effort.

Although the second articulating section 20 may be suspended between the first stair 310 and the second stair 320, since both the first articulating section 10 and the third articulating section 30 may maintain points of contact with the ground 300 and the top surface 328 of the second stair 320, the mobile apparatus 100 is provided with sufficient tractive effort to continue traversing the obstacle without stalling.

Although the above description is of the mobile apparatus 100 traversing a flight of stairs, it will be appreciated that other obstacles may be traversed using the same or similar principles of locomotion. For example, the first articulating section 10 may articulate in a downward direction in response to the front end of the mobile apparatus 100 traversing a sunken grade. The lower portion of the intermediate articulating section 20 may remain substantially parallel to the ground when the first articulating section 10 articulates in the downward direction.

Figure 4:
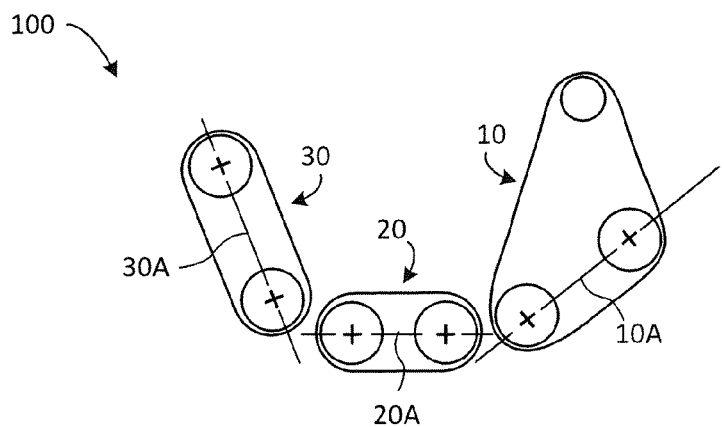
FIG. 4 illustrates the mobile apparatus of FIG. 1 articulated in a first configuration.

FIG. 4 illustrates the mobile apparatus 100 of FIG. 1 articulated in a first position. By way convention, the first articulating section 10 may be described as being articulated in an upward or positive direction, with respect to the second articulating section 20. Similarly, the third articulating section 30 may be described as being articulated in an upward or positive direction, with respect to the second articulating section 20. In some examples, the intermediate articulating section 20 may be understood to articulate about one or both of the first articulating section 10 and the third articulating section 30.

The ability to articulate in an arcuated fashion enables the mobile apparatus 100 to climb a vertical surface having a height greater than height 301 (FIG. 3A) without the mobile apparatus 100 tumbling backwards. Similarly, the ability to articulate one or more sections enables the mobile apparatus 100 to descend a relatively tall object and/or flight of stairs without tumbling forward, end over end.

Figure 4A:
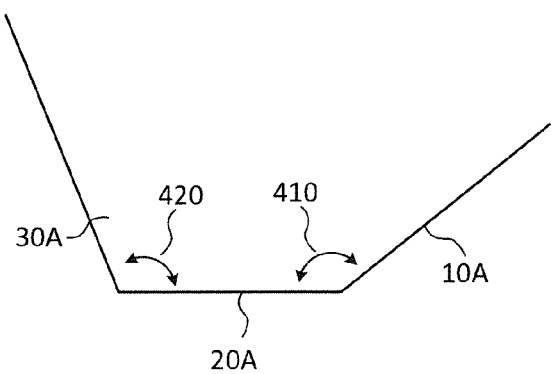
FIG. 4A illustrates a conceptual view of the first configuration of FIG. 4

FIG. 4A illustrates a conceptual view of the first position of FIG. 4. The positive articulation of the first articulating section 10 may be illustrated by a first positive angle 410. The first positive angle 410 may be associated with the angle between the leading section approach angle 10A and the intermediate section approach angle 20A. Additionally, a second positive angle 420 may be associated with the angle between the trailing section approach angle 30A and the intermediate section approach angle 20A. In some examples, the first positive angle 410 may be associated with an angle of between 140 and 160 degrees. Similarly, the second positive angle 420 may be associated with an angle of between 115 and 135 degrees. Other angles may be used depending on the size and geometry of the stairs or other types of obstacles that are being traversed. In other examples, first and positive angles 410 and 420 may be associated with maximum angles of articulation which are the same, or nearly the same as each other. The maximum angle of articulation may be between 115 and 160 degrees.

Figure 5:
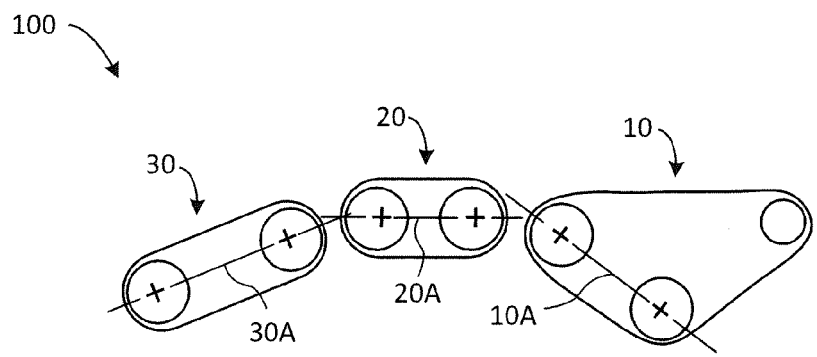
FIG. 5 illustrates the mobile apparatus of FIG. 1 articulated in a second configuration.

FIG. 5 illustrates the mobile apparatus 100 of FIG. 1 articulated in a second position. By way convention, the first articulating section 10 may be described as being articulated in a downward or negative direction, with respect to the second articulating section 20. Similarly, the third articulating section 30 may be described as being articulated in a downward or negative direction, with respect to the second articulating section 20.

Figure 5A:
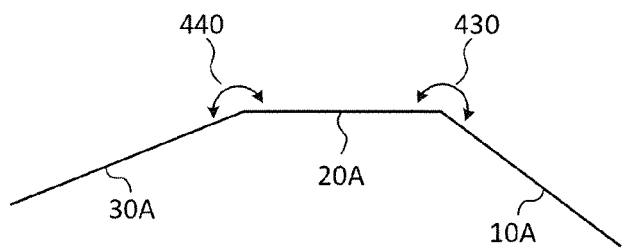
FIG. 5A illustrates a conceptual view of the second configuration of FIG. 5.

FIG. 5A illustrates a conceptual view of the second position of FIG. 5. The negative articulation of the first articulating section 10 may be illustrated by a first negative angle 430. The first negative angle 430 may be associated with the angle between the leading section approach angle 10A and the intermediate section approach angle 20A. Additionally, a second negative angle 440 may be associated with the angle between the trailing section approach angle 30A and the intermediate section approach angle 20A. In some examples, the first negative angle 430 may be associated with an angle of between 200 and 220 degrees. Similarly, the second negative angle 440 may be associated with an angle of between 190 and 210 degrees. Other angles may be used depending on the size and geometry of the stairs or other types of obstacles that are being traversed. In other examples, first and second negative angles 430 and 440 may be associated with maximum angles of articulation which are the same, or nearly the same as each other. The maximum angle of articulation may be between 190 and 220 degrees.

Although two different positions are shown in FIGS. 4 and 5, other permutations of the articulating sections are possible, including an example of the first positive angle 410 combined with the second negative angle 440, and an example of the second positive angle 420 combined with the first negative angle 430, by way of two further non-limiting examples.

Figure 6:
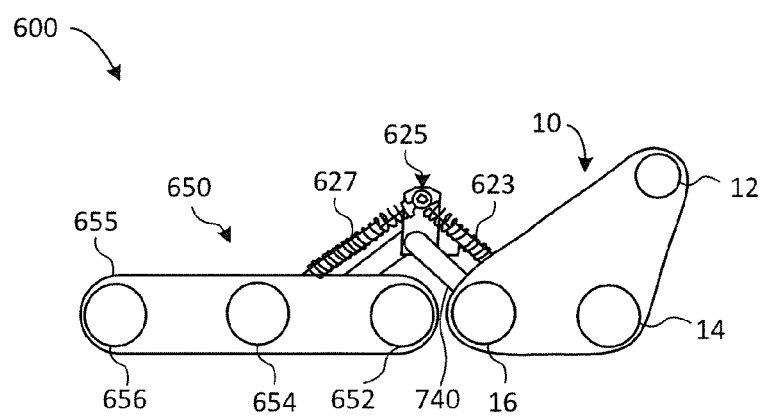
FIG. 6 illustrates a mobile apparatus configured with two articulating sections.

FIG. 6 illustrates a mobile apparatus 600 configured with two articulating sections, including the first articulating section 10 and a second section 650. The first articulating section 10 may be similar to that described with respect to FIG. 1, including a leading traction control assembly comprising one or more gears and/or wheels, such as the upper wheel 12, the first wheel 14, the second wheel 16, or any combination thereof.

The second section 650 may comprise a second traction control assembly 655 including one or more gears and/or wheels, such as a first wheel 652, a second wheel 654, a third wheel 656, or any combination thereof. Although FIG. 6 illustrates a right side of the mobile apparatus 600, it should be understood that there may be an opposite, left side with corresponding traction control assembly, track, gears, and/or wheels similar to that described above.

Mobile apparatus 600 may comprise a connector 625 configured to operatively couple the first articulating section 10 to the second section 650. The connector 625 may comprise one or more connecting members and/or pivot points about which the first articulating section 10 and/or the second section 650 may articulate. The connector 625 may be configured to allow the first articulating section 10 to articulate relative to the second section 650, for example, in response to one or more points of contact of the first articulating section 10 coming into contact with an obstacle. The connector 625 may provide for flexibility in movement of the mobile apparatus 600, and may provide for a variability in angle between the first articulating section 10 and the second section 650.

The articulation of one or both of the first articulating section 10 and the second section 650 may be controlled or moderated by one or more bias elements, such as a first bias element 623 and/or a second bias element 627. The bias elements 623, 627 may be configured to control an angle of articulation between the sections 10, 625, to apply pressure to the traction control assembly to ensure proper rotation, friction, and/or pressure points, and to absorb shock and provide for a smooth transition between obstacles, such as when the mobile apparatus 600 navigates a series of stairs. In some examples, one or both of the first and/or second bias elements 623, 627 may be configured to both dampen shock and to maintain a tractive effort of the mobile apparatus 600.

The second bias element 627 may be coupled between the second section 650 and the connector 625, and may be configured similarly as the first bias element 623. The first bias element 623 may be configured to exert a spring force during either a dynamic movement of a section, or while the mobile apparatus 600 is in a static and/or passive condition. The first bias element 623 may be configured to exert a continuous spring force. In some examples, the continuous spring force may vary as a function of the compressed state of the first bias element 623, with a higher spring force associated with a fully compressed state (e.g., with one or both sections 10, 625 articulated in a first direction of articulation), and a lower spring force associated with a more relaxed state (e.g., with one or both sections 10, 625 articulated in a second direction of articulation, opposite the first direction).

One or both of the bias elements 623, 627 may be configured to exert a compression force against the first articulating section 10 and/or the second section 650. For example, the first bias element 623 may be coupled between the first articulating section 10 and the connector 625 to exert a first compression force which is opposite in direction to the articulation of the first articulating section 10. The second section 623 may be configured to articulate relative to the first articulating section 10. The second bias element 627 may be configured to exert a second compression force which is opposite in direction to the articulation of the second section 650. In some examples, the first bias element 623 and/or the second bias element 627 may be configured to exert a compression force or spring force in the same direction as the articulation of the first articulating section 10 and/or the second section 650.

The articulation of the first articulating section 10 may increase a spring force associated with the first bias element 623. The spring force may be transferred from the first bias element 623 to the second bias element 627. The transferred spring force may cause the second bias element 623 to compress which may in turn cause a second spring force associated with the second bias element 627 to increase. In some example, a bias angle between the first and second bias elements 623, 627 may be foamed as an obtuse angle.

Figure 7:
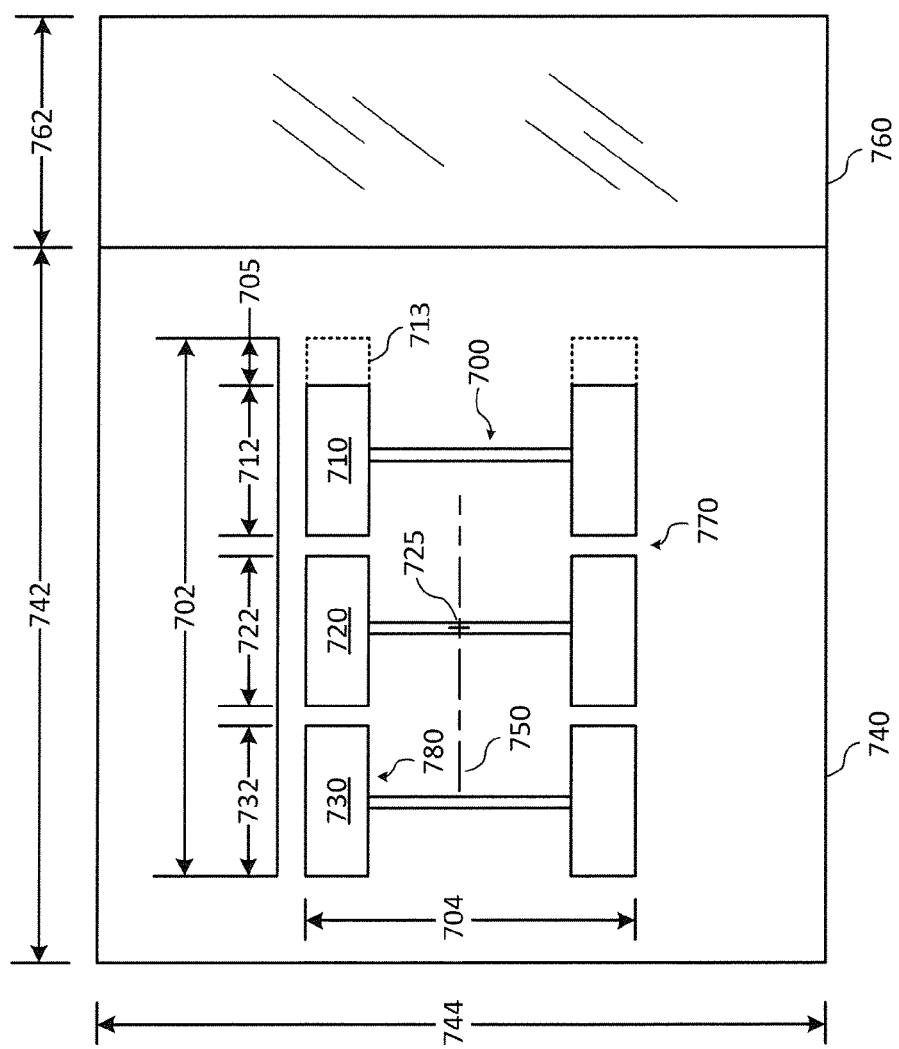
FIG. 7 illustrates a mobile apparatus configured to operate within a confined space.

FIG. 7 illustrates a mobile apparatus 700 configured to operate within a confined space, such as a stair landing 740. The mobile apparatus 700 may comprise a first section 710, a second section 720, a third section 730, or any combination thereof. In some examples, a mobile apparatus comprising two sections, such as mobile apparatus 600, may be configured to navigate the stair landing 740. The stair landing 740 may be located at the base of a flight of stairs, intermediate two flights of stairs, in a stairwell, at a ninety degree intersection and/or turn between adjoining sections of stairs, or any combination thereof.

For applications involving multi-level residences and office buildings, the mobile apparatus 700 may be required to navigate one or more stair landings, such as stair landing 740, in order to navigate between different floors of the building. The ability to navigate stairways and stair landings may be useful for telepresence applications, such as where the mobile apparatus 700 may be used to remotely monitor the health and/or well-being of a resident. For example, a camera may be installed on the mobile apparatus 700 to monitor the surroundings via a video and/or audio feed.

Additionally, Mobile apparatus 700 may be used for law enforcement or military reconnaissance missions where the mobile apparatus 700 may be required to search multiple levels and/or floors of a building. For example, the mobile apparatus 700 may be configured to search for survivors, suspects, terrorists, explosive devices, etc. in conditions which may be potentially hazardous or hostile to a human agent, including radioactive operating conditions.

The length of a stair in many residential and commercial buildings typically varies from between three feet (0.91 meters) to four feet (1.22 meters). The corresponding landing length 744 may be equal to the length of the stair 760. Similarly, the landing width 742 may be equal to the landing length 744, forming an approximately square stair landing. The overall length 702 of the mobile apparatus 700 may be less than both the landing width 742 and the landing length 744. Similarly, the overall width 704 of the mobile apparatus 700 may be less than both the landing width 742 and the landing length 744. In some examples, the overall length 702 may be approximately two and a half feet (0.76 meters) and the overall width 704 may be approximately one and a half feet (0.46 meters), although, other lengths may be used depending on the size and geometry of the sections, stairs or other types of obstacles that are being traversed.

One or more of the articulating sections 710, 720, and/or 730 may comprise a right traction control assembly 770 and a left traction control assembly 780. A propulsion system may be configured to cause the right traction control assembly 770 to move in an opposite rotational orientation as the left traction control assembly 780. For example, the mobile apparatus 700 may be configured to rotate in place about an approximate central point 725 of the mobile apparatus 700, while being located on the stair landing 740. The central point 725 may be located on a longitudinal centerline 750 of the mobile apparatus 700.

Typical stairs in many residential and commercial buildings may have a tread depth 762 of approximately nine inches (22.9 centimeters) to twelve inches (30.5 centimeters). In some examples, the lengths of one or more of the first section 710, the second section 720, and/or the third section 730 may be equal to or less than the tread depth 762.

The first section 710 may have a first footprint 712 of between five inches (12.7 centimeters) and twelve inches (30.5 centimeters) in length. In some examples, the first footprint 712 may be approximately eight and a half inches (21.6 centimeters) in length. The first section 710 additionally may have a leading edge length 705 associated with a leading contact surface 713, similar to leading contact surface 13 of FIG. 1, which may be inclined with respect to the surface of the stair landing 740 and/or the stair 760. The leading edge length 705 may be between one inch (2.5 centimeters) and six inches (15.2 centimeters). In some examples, the leading edge length 705 may be approximately two inches (5.1 centimeters).

Typical stairs in many residential and commercial buildings may have a riser height of between four inches (10.2 centimeters) and eight inches (20.3 centimeters). In some examples, a height of the first section 710 and/or the leading contact surface 713 may be equal to or greater than the riser height of the stair 760.

The second section 720 may have a second footprint 722 of between five inches (12.7 centimeters) and twelve inches (30.5 centimeters) in length. In some examples, the second footprint 722 may be approximately eight and a half inches (21.6 centimeters) in length. The third section 730 may have a third footprint 732 of between five inches (12.7 centimeters) and twelve inches (30.5 centimeters) in length. In some examples, the third footprint 732 may be approximately ten and a half inches (26.7 centimeters) in length.

Figure 8:
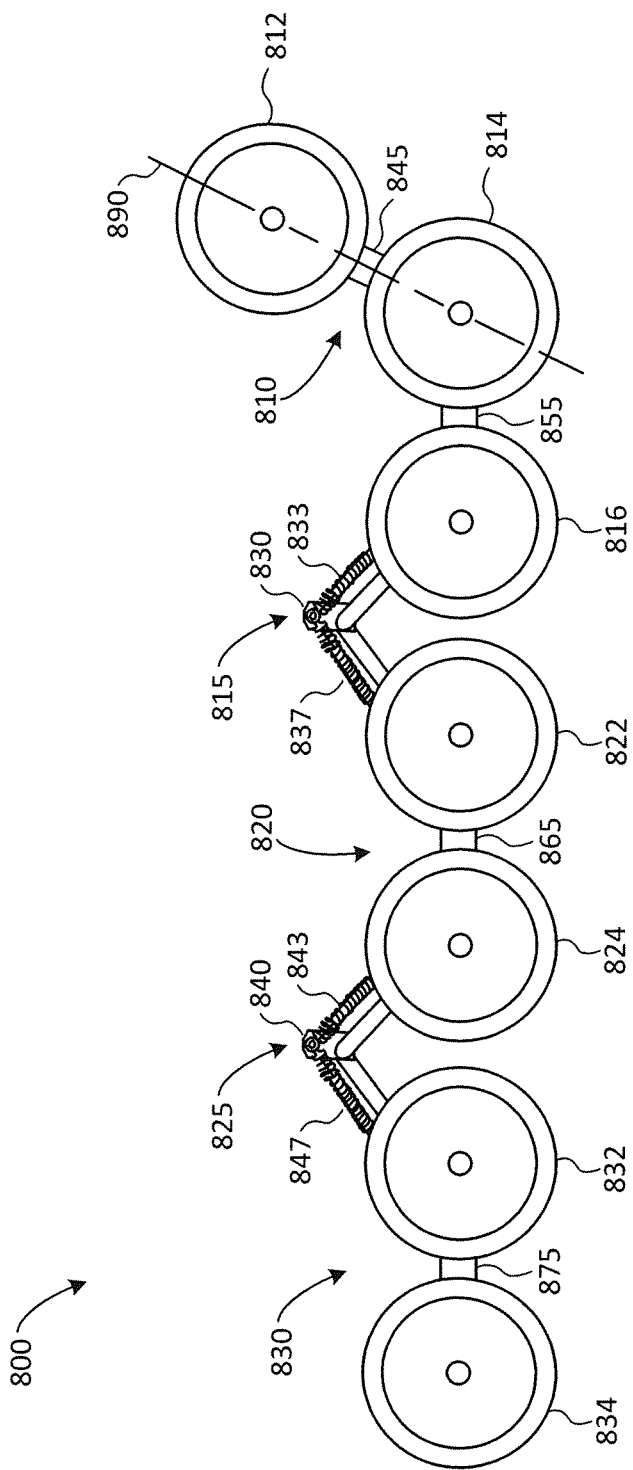
FIG. 8 illustrates a mobile apparatus configured with three articulating sections comprising wheels.

FIG. 8 illustrates a mobile apparatus 800 configured with three articulating sections, including a first articulating section 810, a second articulating section 820, and a third articulating section 830. The three articulating sections 810, 820, 830 may comprise two or more wheels configured as traction devices. The first articulating section 810 may comprise a leading traction control assembly comprising an upper wheel 812, a first wheel 814, and a second wheel 816. The upper wheel 812 and the first wheel 814 may be inclined or positioned at a forward angle 812. The upper wheel 812 may be connected to the first wheel 814 by a first linkage 845. The first wheel 814 may be connected to the second wheel 816 by a second linkage 855.

The second articulating section 820 may comprise a second traction control assembly comprising a first wheel 822 and a second wheel 824. The first wheel 822 may be connected to the second wheel 824 by a third linkage 865. Additionally, a first connector 815 may be configured to operatively couple the first articulating section 810 to the second articulating section 820. The first connector 815 may comprise one or more connecting members 830 and/or pivot points about which the first articulating section 810 and/or the second articulating section 820 may articulate. The first connector 815 may be configured to allow the first articulating section 810 to articulate relative to the second articulating section 820, for example, in response to one or more points of contact of the first articulating section 810 coming into contact with an obstacle. The first connector 815 may provide for flexibility in movement of the mobile apparatus 800, and may provide for a variability in angle between the first articulating section 810 and the second articulating section 820.

The articulation of one or both of the first articulating section 810 and the second articulating section 820 may be controlled or moderated by one or more bias elements, such as a first bias element 833 and/or a second bias element 837. The bias elements 833, 837 may be configured to control an angle of articulation between the sections 810, 820, to apply pressure to one or more wheels to ensure proper rotation, friction, and/or pressure points, and to absorb shock and provide for a smooth transition between obstacles, such as when the mobile apparatus 800 navigates a series of stairs. In some examples, one or both of the first and/or second bias elements 833, 837 may be configured to both dampen shock and to maintain a tractive effort of the mobile apparatus 800.

The third articulating section 830 may comprise a third traction control assembly comprising a first wheel 832 and a second wheel 834. The first wheel 832 may be connected to the second wheel 834 by a fourth linkage 875. Additionally, a second connector 825 may be configured to operatively couple the second articulating section 820 to the third articulating section 830. The second connector 825 may comprise one or more connecting members 840 and/or pivot points about which the second articulating section 820 and/or the third articulating section 830 may articulate. The second connector 825 may be configured to allow the second articulating section 820 to articulate relative to the third articulating section 830, for example, in response to one or more points of contact of the second articulating section 820 coming into contact with an obstacle. The second connector 825 may provide for flexibility in movement of the mobile apparatus 800, and may provide for a variability in angle between the second articulating section 820 and the third articulating section 830.

The articulation of one or both of the second articulating section 820 and the third articulating section 830 may be controlled or moderated by one or more bias elements, such as a fourth bias element 843 and/or a fifth bias element 847. The bias elements 843, 847 may be configured to control an angle of articulation between the sections 820, 830 to apply pressure to one or more wheels to ensure proper rotation, friction, and/or pressure points, and to absorb shock and provide for a smooth transition between obstacles, such as when the mobile apparatus 800 navigates a series of stairs. In some examples, one or both of the third and/or fourth bias elements 843, 847 may be configured to both dampen shock and to maintain a tractive effort of the mobile apparatus 800.

Although FIG. 8 illustrates a right side of the mobile apparatus 800, it should be understood that there may be an opposite, left side with corresponding traction control assemblies similar to that described above.

The lengths, widths, heights, and angles described herein are for illustrative purposes only. For example, the dimensions associated with stairs may be associated with various U.S. and/or international standards; however, stairs and/or other obstacles having different dimensions are also contemplated herein.

Although various examples are illustrated with one or more gears, wheels, and/or tracks configured for locomotion, it should be appreciated that some examples may employ any combination of these elements, including the omission of one more tracks, for example. Similarly, the number of gears and/or wheels is provided for illustrative purposes only, and in some examples, fewer or more gears and/or wheels may be used. One or more section may utilize a track, whereas another section may utilize wheels for tractions. In one example, a front section comprises a track as a traction device, and two trailing sections comprise wheels for traction devices.

The system and apparatus described above may use dedicated processor systems, microcontrollers, programmable logic devices, microprocessors, or any combination thereof, to perform some or all of the operations described herein. Some of the operations described above may be implemented in software and other operations may be implemented in hardware. One or more of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device that may be configured to interface with a networked system, locally and/or remotely, via a wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long as the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of various examples, it should be apparent that the examples may be modified in arrangement and detail without departing from such principles. We claim all modifications and variations coming within the spirit and scope of the following claims.

The invention claimed is:

1. A mobile apparatus, comprising:
   a first articulating section comprising a leading traction control assembly including multiple points of contact inclined at a forward angle;
   a second articulating section comprising an intermediate traction control assembly;
   a propulsion system configured to coordinate movement of the leading traction control assembly and the intermediate traction control assembly;
   a connector operatively coupling the first articulating section to the second articulating section, wherein the first articulating section is configured to articulate relative to the second articulating section in response to one or more of the multiple points of contact of the leading traction control assembly coming into contact with an obstacle; and
   a bias assembly configured to exert a continuous compression force against at least one of the first articulating section and the second articulating section in order to maximize the number of points of contact between the mobile apparatus and the obstacle, wherein the bias assembly comprises:
      a first bias element coupled between the first articulating section and the connector, wherein the first bias element is configured to exert a first compression force which is opposite in direction to the articulation of the first articulating section; and
      a second bias element coupled between the second articulating section and the connector, wherein the second articulating section is configured to articulate relative to the first articulating section, and wherein the second bias element is configured to exert a second compression force which is opposite in direction to the articulation of the second articulating section.

2. The mobile apparatus of claim 1, wherein the forward angle associated with the multiple points of contact varies according to the articulation of the first articulating section.

3. The mobile apparatus of claim 1, wherein the first bias element is coupled to the first articulation section at a first point, wherein both the first bias element and second bias element are attached to the connector at a central point, wherein the second bias element is coupled to the second articulation section at a second point, and wherein the first, central, and second points form an obtuse angle.

4. The mobile apparatus of claim 3, wherein the obtuse angle varies during an articulation of either the first articulation section or the second articulation section.

5. The mobile apparatus of claim 4, wherein the obtuse angle varies within a maximum angle of articulation, and wherein a front portion of the second articulation section is configured to raise in response to the obtuse angle reaching the maximum angle of articulation.

6. The mobile apparatus of claim 1, further comprising:
   a third articulating section comprising a trailing traction control assembly; and
   a second connector operatively coupling the third articulating section to the second articulating section, wherein the propulsion system is configured to coordinate movement of the leading traction control assembly, the intermediate traction control assembly, and the trailing traction control assembly.

7. The mobile apparatus of claim 6, wherein the third articulating section is configured to articulate relative to the second articulating section.

8. The mobile apparatus of claim 7, further comprising a third bias element coupled between the third articulating section and the second connector, wherein the third bias element is configured to exert a compression force which is opposite in direction to the articulation of the third articulating section.

9. The mobile apparatus of claim 8, further comprising a fourth bias element coupled between the second articulating section and the second connector, wherein the second articulating section is configured to articulate relative to the third articulating section, and wherein the fourth bias element is configured to exert a compression force which is opposite in direction to the articulation of the second articulating section.

10. The mobile apparatus of claim 9, wherein the third bias element and the fourth bias element are arranged together to form an obtuse angle.

11. The mobile apparatus of claim 1, wherein a lower portion of the leading traction control assembly and a lower portion of the intermediate traction control assembly are arranged in a substantially parallel configuration when the mobile apparatus travels over relatively flat ground, and wherein a front end of the leading traction control assembly is configured to raise off the ground in response to contacting the obstacle.

12. The mobile apparatus of claim 11, wherein the lower portion of the intermediate traction control assembly remains substantially parallel to the ground when the front end of the leading traction control raises off the ground.

13. The mobile apparatus of claim 11, wherein the first articulating section is further configured to articulate in a downward direction in response to the front end of the leading traction control assembly traversing a sunken grade, and wherein the lower portion of the intermediate traction control assembly remains substantially parallel to the ground when the first articulating section articulates in the downward direction.

14. The mobile apparatus of claim 13, further comprising a shock absorber coupled to the first articulating section and configured to both dampen shock and to maintain a tractive effort of the leading traction control assembly in the sunken grade by exerting a spring force in the downward direction.

15. The mobile apparatus of claim 1, wherein the leading traction control assembly comprises a right traction control assembly and a left traction control assembly, and wherein the propulsion system is configured to cause the right traction control assembly to move in an opposite rotational orientation as the left traction control assembly causing the mobile apparatus to rotate in place about an approximate central point of rotation.

16. A mobile apparatus, comprising:
a first traction control assembly;
a second traction control assembly;
a third traction control assembly;
first means for coupling, wherein the first means for coupling couples the first traction control assembly to the second traction control assembly, and wherein the first traction control assembly comprises multiple points of contact inclined at a forward angle;
second means for coupling, wherein the second means for coupling couples the second traction control assembly to the third traction control assembly;
means for providing tractive effort to the first traction control assembly, the second traction control assembly, and the third traction control assembly, wherein the means for providing tractive effort is mounted on the mobile apparatus;
first means for articulating, wherein the first means for articulating articulates the first traction control assembly relative to the second traction control assembly in response to one or more of the multiple points of contact of the first traction control assmebly coming into contact with an obstacle; and
means for exerting a first compressive force which is opposite in direction to the articulation of the first traction control assembly, wherein the first compressive force is exerted on to the first traction control assembly.

17. The mobile apparatus of claim 16, further comprising:
second means for articulating, wherein the second means for articulating articulates the third traction control assembly relative to the second traction control assembly; and
means for exerting a second compressive force which is opposite in direction to the articulation of the third traction control assembly, wherein the second compressive force is exerted on to the third traction control assembly.

18. A mobile apparatus, comprising:
a first articulating section comprising a traction control assembly including multiple points of contact inclined at a forward angle;
a propulsion system mounted on the mobile apparatus and configured to coordinate movement of the traction control assembly;
a second articulating section;
a connector operatively coupling the first articulating section to the second articulating section, wherein the first articulating section is configured to articulate relative to the second articulating section in response to one or more of the multiple points of contact of the leading traction control assembly coming into contact with an obstacle; and
a bias assembly configured to exert a continuous compression force against both of the first articulating section and the second articulating section in order to maximize the number of points of contact between the mobile apparatus and the obstacle.

19. The mobile apparatus of claim 18, wherein the bias assembly comprises one or more bias elements coupled to the connector, wherein the one or more bias elements are configured to exert the continuous compression force in an opposite direction to the articulation of the first articulating section.

20. The mobile apparatus of claim 18, wherein the first articulating section is configured to articulate in a downward direction while the second articulating section is traveling over relatively flat ground, and wherein the bias assembly is configured to maintain a tractive effort of the traction control assembly by exerting the continuous compression force in the downward direction.

21. The mobile apparatus of claim 20, wherein the bias assembly comprises a shock absorber coupled to the first articulating section and configured to dampen shock of the first articulating section articulating in the downward direction.

* * * * *

UNITED STATES PATENT AND TRADEMARK OFFICE
CERTIFICATE OF CORRECTION

| | | |
|---|---|---|
| PATENT NO. | : 8,434,576 B1 | Page 1 of 1 |
| APPLICATION NO. | : 13/590745 | |
| DATED | : May 7, 2013 | |
| INVENTOR(S) | : Andrew Ferguson | |

It is certified that error appears in the above-identified patent and that said Letters Patent is hereby corrected as shown below:

In the Claims:

Column 18, line 8 (Claim 16):   Replace "assmebly" with --assembly--

Signed and Sealed this
Eighth Day of October, 2013

Teresa Stanek Rea
*Deputy Director of the United States Patent and Trademark Office*